United States Patent Office 3,513,190
Patented May 19, 1970

3,513,190
[(1-ORGANOTHIO-2,2-DIACYLETHYL) PHENOXY] ALKANOIC ACIDS
Edward J. Cragoe, Jr., and John B. Bicking, Lansdale, Pa., assignors to Merck & Co., Inc., Rahway, N.J., a corporation of New Jersey
No Drawing. Filed Jan. 11, 1967, Ser. No. 608,489
Int. Cl. C07c 103/26, 149/16
U.S. Cl. 260—516           10 Claims

ABSTRACT OF THE DISCLOSURE

This invention relates to adducts which are synthesized by the addition of a mercaptan across the vinyl double bond of a [(2,2-diacylvinyl)phenoxy]alkanoic acid. The [(1-organothio - 2,2 - diacylethyl)phenoxy]alkanoic acid products thus obtained are useful as diuretic and saluretic agents which alleviate conditions associated with electrolyte and fluid retention.

This invention relates to a new class of chemical compounds which can be described generally as [(1-organothio-2,2-diacylethyl)phenoxy]alkanoic acids and to the non-toxic, pharmacologically acceptable salts, esters and amide derivatives thereof.

Pharmacological studies show that the instant products are effective diuretic and saluretic agents which can be used in the treatment of conditions associated with electrolyte and fluid retention and hypertension. When administered in therapeutic dosages, in conventional vehicles, the instant products effectively reduce the amount of sodium and chloride ion in the body, lower dangerous excesses of fluid levels to acceptable limits and, in general, alleviate conditions usually associated with edema.

The [(1-organothio-2,2-diacylethyl)phenoxy]alkanoic acids of this invention are compounds having the following general formula:

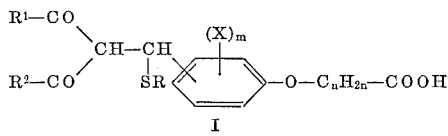

I wherein R is alkyl, for example, lower alkyl, such as methyl, ethyl, propyl, isopropyl, isobutyl, pentyl, etc.; cycloalkyl, for example, lower cycloalkyl containing from 5–6 nuclear carbon atoms such as cyclopentyl and cyclohexyl, etc.; lower alkenyl, for example, allyl, etc.; carboxy lower alkyl, for example, carboxymethyl, 2-carboxyethyl, etc.; amino lower alkyl, for example, 2-aminoethyl, etc.; amino substituted carboxy lower alkyl, for example, 2-amino-2-carboxyethyl, 3-amino-3-carboxypropyl, etc.; hydroxy lower alkyl, for example, 2-hydroxyethyl, etc.; lower alkanoyl, for example, acetyl, etc.; aryl, for example, mononuclear aryl such as phenyl which may be unsubstituted or substituted by carboxy and aralkyl, for example, mononuclear aralkyl such as benzyl, phenethyl, etc.; $R^1$ and $R^2$ are similar or dissimilar members selected from alkyl, for example, lower alkyl such as methyl, ethyl, propyl, isopropyl, butyl, pentyl, etc.; aryl, for example, mononuclear aryl such as phenyl and aralkyl, for example, mononucelar aralkyl, such as benzyl, phenethyl, etc.; the X radicals are similar or dissimilar members selected from hydrogen, halogen, for example, chloro, bromo, fluoro, iodo, etc.; alkyl, for example, lower alkyl and, taken together, two X radicals on adjacent carbon atoms of the benzene ring may be joined to form an hydrocarbylene chain (i.e., a divalent organic radical composed solely of carbon and hydrogen) containing 4 carbon atoms between their points of attachment, for example, tetramethylene, 1,3-butadienylene, i.e.,

etc.; $m$ is an integer having a value of 1–4 and $n$ is an integer having a value of 1–3; and the nontoxic, pharmacologically acceptable acid addition salts, lower alkyl esters, amide, lower alkylamide and di-lower alkylamide derivatives thereof.

A preferred embodiment of this invention relates to the [4-(1-organothio-2,2-dialkanoylethyl)phenoxy]acetic acids having the following general formula:

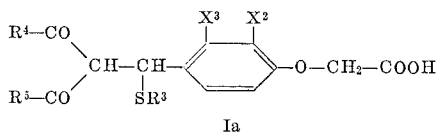

Ia wherein $R^3$ is amino lower alkyl, carboxy lower alkyl, amino substituted carboxyl lower alkyl or carboxyphenyl; $R^4$ and $R^5$ are lower alkyl and $X^2$ and $X^3$ are similar or dissimilar members selected from hydrogen, halogen and lower alkyl; and the nontoxic, pharmacological acceptable acid addition salts, lower alkyl esters and amides thereof. The foregoing class of compounds exhibits particularly good diuretic and saluretic activity and thus represents a preferred subgroup of compounds within the scope of this invention.

The products (I) of this invention are conveniently obtained by the reaction of a [(2,2-diacylvinyl)phenoxy] alkanoic acid (II, infra) with an appropriate mercaptan. If desired, the reaction may be catalyzed by the presence of weak base as, for example, by the addition of sodium carbonate, etc.; however, the use of a basic reagent is optional only and not strictly necessary to the success of the process. If weak base is employed the products are obtained in the form of their carboxylate salts and therefore, if the [(1-organothio-2,2-diacylethyl)phenoxy]alkanoic acid products (I) are desired, it is necessary to treat the intermediate salts thus obtained with acid such as hydrochloric acid to obtain the free carboxylic acid (I). Preferably, the process is conducted in an aqueous solution or in a lower alkanol such as ethanol; however, the choice of a suitable reaction medium is within the purview of one skilled in the art and, generally, any solvent in which the reactants are reasonably soluble and which is substantially inert with respect to the said starting materials may be employed in an analogous manner. The following equation illustrates this method of preparation:

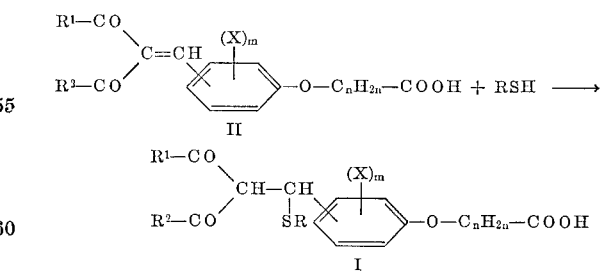

wherein R, $R^1$, $R^2$, X, $m$ and $n$ are as defined above. Similarly, by substituting the corresponding ester, amide, lower alkylamide or di-lower alkylamide for the acid reactant (II) depicted above and conducting the reaction in an otherwise analogous manner, the ester and amide derivatives of the instant [(1-organothio-2,2-diacylethyl)phenoxy]alkanoic acid products (I) may be obtained.

In addition to the foregoing methods the salts, esters and amides of the instant products (I) may be derived from the said [(1-organothio-2,2-diacylethyl)phenoxy]- alkanoic acids, per se, by methods well known to those skilled in the art. Thus, for example, the said salts may be obtained by treating the acid products (I) with a base having a pharmacologically acceptable cation as, for example, by treating with alkali metal and alkaline earth metal hydroxides, carbonates, etc., primary, secondary and tertiary amines such as monoalkylamines, dialkylamines, trialkylamines, nitrogen containing heterocyclic amines, for example, piperidine, etc. The foregoing and other equivalent methods for the preparation of the instant salts, esters and amide derivatives of the instant products (I) will be apparent to those having ordinary skill in the art and to the extent that the said derivatives are both nontoxic and physiologically acceptable to the body system, the said salts, esters and amides are the functional equivalent of the corresponding [(1-organothio-2,2-diacylethyl)phenoxy]alkanoic acids (I).

The [(1 - organothio-2,2-diacylethyl)phenoxy]alkanoic acids (I) of this invention and the salts thereof are generally obtained as crystalline solids and, if desired, may be purified by recrystallization from a suitable solvent or from a mixture of solvents as, for example, from benzene or from a mixture of benzene and cyclohexane, etc.

The [(2,2-diacylvinyl)phenoxy]alkanoic acid starting materials (II) of the foregoing process are conveniently obtained by either of three alternate routes.

According to one method for the preparation of the said starting materials (II) a formyl substituted phenoxyalkanoic acid (III, infra) or a suitably esterified derivative thereof as, for example, a lower alkyl ester derivative, is treated with a diacylmethane in a water-immiscible solvent such as benzene, toluene, xylene, acetic acid, dimethylformamide, etc. in the presence of a catalytic amount of an amine salt of a carboxylic acid such as piperidine acetate. Also, it is advantageous to remove the water formed during the process as, for example, by the use of chemical dehydrating agents, molecular sieves, azeotropic distillation, etc. The reaction may be conducted at ambient temperature but, in general, it is desirable to conduct the process at elevated temperatures as, for example, at the reflux temperature of the solvent system. The following equation illustrates the reaction:

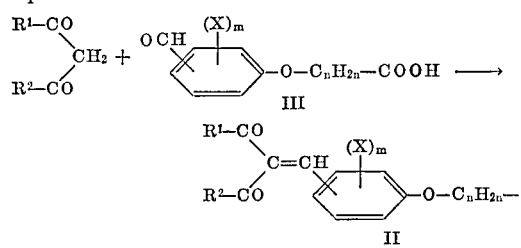

wherein $R^1$, $R^2$, X, m and n are as defined above.

A second method for the preparation of the [(2,2-diacylvinyl)phenoxy]alkanoic acid starting materials (II) consists in treating a 2-(hydroxybenzylidene)-1,3-diketone (IV, infra) with a suitable etherification reagent in the presence of a base followed by the conversion of the [(2,2-diacylvinyl)phenoxy]alkanoic acid salt (V, infra) thus formed to the corresponding acid by acidification of the reaction mixture. Suitable bases which may be employed include, for example, alkali metal carbonates such as potassium carbonate, alkali metal alkoxides such as sodium methoxide, potassium methoxide, sodium ethoxide, etc. This process is suitable for preparing those [(2,2-diacylvinyl)phenoxy]alkanoic acid reactants (IIa, infra) which contain an alkylene chain having a single carbon or three carbon atoms between the carboxy group and oxygen moiety. Thus, the etherification reagent employed is an haloalkanoic acid having the formula:

$$X^1-C_wH_{2w}-COOM$$

wherein $X^1$ is halogen, for example, chlorine, bromine, iodine, etc., $-C_wH_{2w}-$ is a methylene or trimethylene radical and M is hydrogen or the cation derived from an alkali metal hydroxide, an alkali metal carbonate, etc. such as a sodium or potassium cation. The following equation wherein the etherification reagent employed is an haloalkanoic acid and the basic reagent is potassium carbonate illustrates this method of preparation; however, it is to be understood that the alkali metal salts of the haloalkanoic acid reactant may also be employed in an otherwise analogous process and that other basic reagents such as sodium carbonate or alkali metal alkoxides may also be employed:

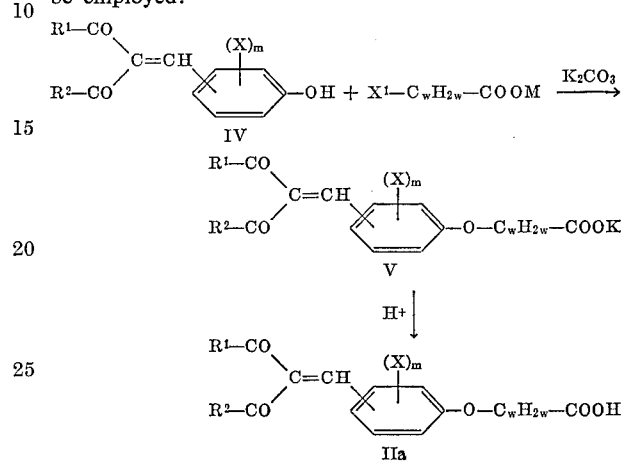

wherein $R^1$, $R^2$, X, $X^1$, M, m and w are as defined above and $H^+$ is the cation derived from an organic or inorganic acid such as hydrochloric acid, etc. The choice of a suitable solvent for the process is dependent largely upon the character of the reactants but, in general, any solvent which is substantially inert and in which the reagents are reasonably soluble may be employed; however, ethanol and acetone are particularly advantageous media in which to conduct the process. Also, the reaction may be carried out at ambient temperatures but, generally, it is desirable to conduct the reaction at temperatures slightly above ambient temperature.

Those [(2,2-diacylvinyl)phenoxy]alkanoic acid reactants which contain two linear carbon atoms in the alkylene chain between the carboxy group and oxygen moiety are also obtained by the etherification of a 2-(hydroxybenzylidene)-1,3-diketone (IV, infra) but, in lieu of employing the metal salt of an haloalkanoic acid as described in the preceding etherification process, a propiolactone or an appropriately substituted derivative thereof is used. Also, the instant process is conducted in the presence of a base such as an aqueous solution of sodium hydroxide and, preferably, with heating at reflux temperatures. Acidification of the intermediate salt (VI, infra) thus obtained then yields the desired product (IIb, infra). The following equation illustrates this method of preparation:

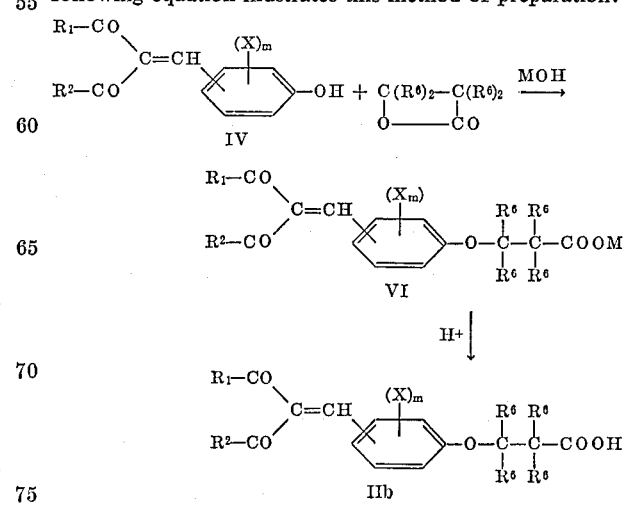

wherein $R^1$, $R^2$, X, M, $m$ and $H^+$ are as defined above and the $R^6$ radicals are hydrogen or methyl but only one of which is methyl.

A third method for preparing the [(2,2-diacylvinyl) phenoxy]alkanoic acid starting materials of the invention consists in the hydrolysis of a [(2,2-diacylvinyl) phenoxy]alkanoic acid ester (VII, infra). The hydrolysis is conducted in the conventional manner by treatment of the said ester (VII) with an aqueous solution of an acid, for example, with an aqueous solution of hydrochloric acid, in which instance a solvent such as acetic acid may be used or, alternatively, the hydrolysis may be conducted with an aqueous solution of a base as, for example, with an aqueous solution of sodium bicarbonate in which instance a lower alkanol solvent is advantageously employed. However, when an aqueous basic solution is used it is necessary to treat the carboxylate salt intermediate thus formed with an acid to obtain the desired carboxylic acid product (II). The following equation illustrates this method of preparation:

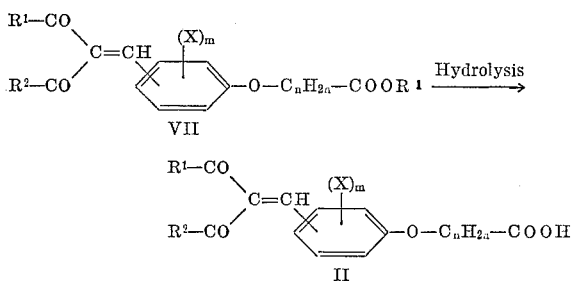

wherein $R^1$, $R^2$, X, $m$ and $n$ are as defined above and $R^7$ is an hydrocarbyl radical, i.e., an organic radical composed solely of carbon and hydrogen such as an alkyl radical, etc.

The formyl substituted phenoxyalkanoic acids (III), the esters of [(2,2-diacylvinyl)phenoxy]alkanoic acid (VII) and the 2-(hydroxybenzylidene)-1,3-diketones (IV) employed as intermediates in the preparation of the [(2,2-diacylvinyl)phenoxy]alkanoic acid starting materials, supra, and the methods for their preparation, are described in applicants' copending U.S. application Ser. No. 482,040, filed Aug. 20, 1965.

The examples which follow illustrate the [(1-organothio-2,2-diacylethyl)phenoxy]alkanoic acids (I) of the invention and the methods by which they are prepared. However, the examples are illustrative only and it will be apparent to those having ordinary skill in the art that all of the products embraced by Formula I, supra, may be prepared in an analogous manner by substituting the appropriate starting materials for those set forth in the examples.

EXAMPLE 1

[2,3-dichloro-4-(1-methylthio-2-acetyl-3-oxobutyl) phenoxy]acetic acid

Step A: Ethyl [2,3-dichloro - 4 - (2,2-diacetylvinyl) phenoxy]acetate.—A mixture of ethyl (2,3-dichloro-4-formylphenoxy)acetate (41.6 g., 0.15 mole), acetylacetone (16.5 g., 0.165 mole), ethanol (200 ml.) and piperidine (3 ml.) is warmed at 45° C. for 25 minutes to obtain a clear solution. The solution is allowed to stand at room temperature for 22 hours and then is chilled. The crystals which separate are removed by filtration to yield 48.5 g. (90%) of ethyl [2,3-dichloro-4-(2,2-diacetylvinyl)phenoxy]acetate, M.P. 118–123° C.

Step B: [2,3-dichloro-4-(2,3-diacetylvinyl)phenoxy] acetic acid.—A solution of ethyl [2,3-dichloro-4-(2,2-diacetylvinyl)phenoxy]acetate (48.5 g., 0.135 mole) in acetic acid (225 ml.) and 5% hydrochloric acid (100 ml.) is heated on a steam bath for 40 minutes then cooled and diluted with water (300 ml.). The crystalline product is separated by filtration and dissolved in a dilute sodium bicarbonate solution. A small amount of insoluble material is removed by filtration and the filtrate made acid to Congo red paper by the addition of hydrochloric acid. The resulting precipitate is separated by filtration, dried and recrystallized from ethyl acetate to obtain 32.0 g. (71%) of [2,3-dichloro-4-(2,2 - diacetylvinyl)phenoxy] acetic acid, M.P. 184.5–186.5° C.

Analysis.—Calculated for $C_{14}H_{12}Cl_2O_5$ (percent): C, 50.77; H, 3.65; Cl, 21.41. Found (percent): C, 50.78; H, 3.77; Cl, 21.27.

Step C: [2,3-dichloro-4-(1-methylthio-2-acetyl-3-oxobutyl)phenoxy]acetic acid.—[2,3-dichloro - 4 - (2,2-diacetylvinyl)phenoxy]acetic acid (3.3 g., 0.01 mole) is added to a saturated aqueous solution of sodium bicarbonate (40 ml.) whereupon the sodium salt of the acid precipitates. Methyl mercaptan (approx. 0.5 g., 0.01 mole) is then passed into the mixture for 20 minutes until a clear solution is obtained. The solution is acidified to yield a gummy precipitate which is taken up in either, dried over sodium sulfate, and the ether evaporated to a residue which soon crystallizes. Recrystallization from benzene yields 2.0 g. (53%) of [2,3-dichloro-4-(1-methylthio-2-acetyl - 3 - oxobutyl)phenoxy]acetic acid, M.P. 115.5–117.5° C.

Analysis.—Calculated for $C_{15}H_{16}Cl_2O_5S$ (percent): C, 47.50; H, 4.25. Found (percent): C, 47.89; H, 4.28.

EXAMPLE 2

[2,3-dichloro-4-(1-benzylthio-2-acetyl-3-oxobutyl) phenoxy]acetic acid

Benzyl mercaptan (1.0 g., 0.008 mole) is added to a mixture of [2,3-dichloro-4-(2,2-diacetylvinyl)phenoxy] acetic acid (2.3 g., 0.007 mole) and saturated aqueous sodium bicarbonate (30 ml.). Within 10 minutes a clear solution is obtained. The solution then is acidified with hydrochloric acid to yield an oily product which is taken up in ether, dried over sodium sulfate, and the ether evaporated. The residue crystallizes and is purified by recrystallization from benzene-cyclohexane to yield 1.1 g. (30%) of [2,3-dichloro-4-(1-benzylthio-2-acetyl-3-oxobutyl)phenoxy]acetic acid, M.P. 104–107° C.

Analysis.—Calculated for $C_{21}H_{20}Cl_2O_5S$ (percent): C, 55.39; H, 4.43. Found (percent): C, 55.39; H, 4.45.

EXAMPLE 3

[2,3-dichloro-4-(1-carboxymethylthio-2-acetyl-3-oxobutyl)phenoxy]acetic acid

By substituting thioglycolic acid for the benzyl mercaptan recited in Example 2, Step C, and following the procedure described therein the product [2,3-dichloro-4-(1 - carboxymethylthio-2-acetyl - 3 - oxobutyl)phenoxy] acetic acid, M.P. 164.5–166.5° C., in 29% yield is obtained.

Analysis.—Calculated for $C_{21}H_{18}Cl_2O_7S$ (percent): C, 45.40; H, 3.81. Found (percent): C, 45.39; H, 3.89.

EXAMPLE 4

[2,3-dichloro-4-[1-(2-carboxyphenylthio)-2-acetyl-3-oxobutyl]-phenoxy] acetic acid By substituting thiosalicylic acid for the methyl mercaptan recited in Example 1, Step C, and following the procedure described therein the product [2,3-dichloro-4-[1 - (2-carboxyphenylthio)-2-acetyl-3-oxobutyl]phenoxy] acetic acid, M.P. 163.5–166.5° C., in 26% yield upon recrystallization from ethyl acetate is obtained.

Analysis.—Calculated for $S_{21}H_{18}Cl_2O_7S$ (percent): C, 51.97; H, 3.74. Found (percent): C, 52.17; H, 3.96.

EXAMPLE 5

Ethyl [2,3-dichloro-4-[1-(2-aminoethylthio)-2-acetyl-3-oxobutyl]phenoxy]acetate hydrochloride A solution of ethyl [2,3-dichloro-4-(2,2-diacetylvinyl)-phenoxy]acetate (7.2 g., 0.02 mole), 2-mercaptoethylamine (1.6 g., 0.021 mole) and triethylamine (0.2 ml.) in 100 ml. of ethanol is allowed to stand 24 hours at room temperature. The ethanol is removed by vacuum distillations and the residual oil is taken up in ether, washed with several portions of water and dried over sodium sulfate. Gaseous hydrogen chloride then is passed into the dried ether solution whereupon a precipitate of the hydrochloride of ethyl [2,3-dichloro-4-[1-(2-aminoethylthio)-2-acetyl-3-oxobutyl]phenoxy] acetate is obtained.

EXAMPLE 6

[2,3-dichloro-4-[1-(2-amino-2-carboxyethylthio)-2-acetyl-3-oxobutyl]phenoxy]acetic acid By substituting cysteine hydrochloride for the methyl mercaptan recited in Example 1, Step C, and following the procedure described therein the product [2,3-dichloro-4-[1 - (2-amino-2-carboxyethylthio)-2-acetyl-3-oxobutyl]phenoxy]acetic acid is obtained.

EXAMPLE 7

2-[2,3-dichloro-4-(1-isopropylthio-2-acetyl-3-oxobutyl)phenoxy]propionic acid

Step A: Ethyl 2-[2,3-dichloro-4-(2,2-diacetylvinyl)-phenoxy]propionate.—A mixture of ethyl 2-(2,3-dichloro-4-formylphenoxy)propionate (7.25 g., 0.025 mole), acetylacetone (2.5 g., 0.025 mole), piperidine (0.6 g.) and ethanol (13 ml.) is stirred and warmed at 45° C. for 20 minutes. The solution is allowed to stand at room temperature for three hours and then is chilled overnight.

The crystalline product is collected to obtain 7.5 g. (87.5%) of ethyl 2-[2,3-dichloro-4-(2,2-diacetylvinyl)-phenoxy]propionate, M.P. 110–112° C. After recrystallization from a mixture of ethyl acetate and hexane the product melts at 112–113° C.

*Analysis.*—Calculated for $C_{17}H_{18}Cl_2O_5$ (percent): C, 54.70; H, 4.86. Found (percent): C, 54.83; H, 5.05.

Step B: 2-[2,3-dichloro-4-(2,2-diacetylvinyl)phenoxy]-propionic acid.—By following the procedure of Example 1, Step B, but substituting ethyl 2-[2,3-dichloro-4-(2,2-diacetylvinyl)phenoxy]propionate for the ethyl [2,3-dichloro-4-(2,2-diacetylvinyl)phenoxy]acetate recited therein and recrystallizing the product from a mixture of ethyl acetate and hexane there is obtained 2-[2,3-dichloro-4-(2,2-diacetylvinyl)phenoxy]propionic acid in 36% yield, M.P. 152–154° C.

*Analysis.*—Calculated for $C_{15}H_{14}Cl_2O_5$ (percent): C, 52.19; H, 4.09. Found (percent). C, 52.55; H, 4.10.

Step C: 2-[2,3-dichloro-4-(1-isopropylthio-2-acetyl-3-oxobutyl)phenoxy]propionic acid.—By substituting isopropyl mercaptan and 2-[2,3-dichloro-4-(2,2-diacetylvinyl)phenoxy]propionic acid for the methyl mercaptan and [2,3-dichloro - 4 - (2,2-diacetylvinyl)phenoxy]acetic acid recited in Example 1, Step C, and following the procedure described therein the product 2-[2,3-dichloro-4-(1-isopropylthio-2-acetyl-3-oxobutyl)phenoxy]propionic acid is obtained.

EXAMPLE 8

[3-(1-cyclohexylthio-2-acetyl-3-oxobutyl)-4-chlorophenoxy]acetic acid

Step A: [3-(2,2-diacetylvinyl)-4-chlorophenoxy]acetic acid.—A mixture of ethyl (3-formyl-4-chlorophenoxy)-acetate (4 g., 0.0165 mole), acetylacetone (1.65 g., 0.0165 mole), piperidine (0.4 ml.) and ethanol (15 ml.) is stirred and warmed at 45° C. for 20 minutes. The solution is kept at room temperature for three hours and then cooled overnight. The solution is diluted with ether, washed with water, dried and concentrated to give 5.5 g. of an oil, which is ethyl [3-(2,2-diacetylvinyl)-4-chlorophenoxy]-acetate.

The ethyl [3-(2,2-diacetylvinyl)-4-chlorophenoxy]acetate is dissolved in acetic acid (25 ml.) and 5% hydrochloric acid (14 ml.) and the solution heated at 100° C. for one hour. The solution then is extracted with ether and the ether phase extracted with a saturated sodium bicarbonate solution. The aqueous layer is acidified and the product extracted into ether. The ether solution is evaporated and the product recrystallized from a mixture of ethyl acetate and hexane to obtain 2.5 g. (48.5%) of [3-(2,2-diacetylvinyl)-4-chlorophenoxy]acetic acid having a melting point of 98–100° C. Upon recrystallization from butyl chloride the product melts at 102–104° C.

*Analysis.*—Calculated for $C_{14}H_{13}ClO_5$ (percent): C, 56.67; H, 4.42. Found (percent): C, 56.63; H, 4.63.

Step B: [3-(1-cyclohexylthio-2-acetyl-3-oxobutyl)-4-chlorophenoxy]acetic acid.—By substituting cyclohexyl mercaptan and [3-(2,2-diacetylvinyl)-4-chlorophenoxy]-acetic acid, respectively, for the methyl mercaptan and [2,3-dichloro-4-(2,2-diacetylvinyl)phenoxy]acetic acid recited in Example 1, Step C, and following the procedure described therein the product [3-(1-cyclohexylthio-2-acetyl-3-oxobutyl)-4-chlorophenoxy]acetic acid is obtained.

EXAMPLE 9

[2,3-dichloro-4-(1-acetylthio-2-acetyl-3-oxobutyl)-phenoxy]acetamide

Step A: [2,3-dichloro-4-(2,2-diacetylvinyl)phenoxy]-acetamide.—A mixture of [2,3-dichloro-4-(2,2-diacetylvinyl)phenoxy]acetic acid (4 g., 0.012 mole), obtained as described in Example 1, Step B, thionyl chloride (24.6 g., 0.206 mole), and benzene (15 ml.) is refluxed for three hours whereby a clear solution is obtained. Volatile materials are removed by vacuum distillation leaving [2,3-dichloro-4-(2,2-diacetylvinyl)phenoxy]acetyl chloride as a viscous oil.

Anhydrous ammonia is added over 15 minutes to the oily [2,3-dichloro - 4 - (2,2-diacetylvinyl)phenoxy]acetyl chloride in benzene (50 ml.). After removal of ammonium chloride by filtration the filtrate is concentrated to yield 1.0 g. of solid [2,3-dichloro-4-(2,2-diacetylvinyl)-phenoxy]acetamide, M.P. 189–192° C.

Recrystallization of the product from ethyl acetate gives 800 mg. (20%) of pure [2,3-dichloro-4-(2,2-diacetylvinyl)phenoxy]acetamide, M.P. 194.5–196.5° C.

*Analysis.*—Calculated for $C_{14}H_{13}Cl_2NO_4$ (percent): C, 50.93; H, 3.97; N, 4.24. Found (percent): C, 50.89; H, 4.03; N, 4.22.

Step B: [2,3-dichloro-4-(1-acetylthio-2-acetyl-3-oxobutyl)phenoxy]acetamide.—A solution of [2,3-dichloro-4-(2,2-diacetylvinyl)phenoxy]acetamide (3.3 g., 0.01 mole), thiolacetic acid (0.9 g., 0.012 mole) and one drop of triethylamine in 60 ml. of ethanol is allowed to stand at room temperature for six hours. The ethanol is then removed by vacuum distillation and the residue triturated with water to yield crystalline [2,3-dichloro-4-(1-acetylthio-2-acetyl-3-oxobutyl)phenoxy]acetamide.

In a manner similar to that described in Example 1 for the preparation of [2,3-dichloro-4-(1-methylthio-2-acetyl-3-oxobutyl)phenoxy]acetic acid all of the products (I) of this invention may be obtained. Thus, by substituting an appropriate (4-formylphenoxy)alkanoic acid ester (IIIa, infra) and diacylmethane reactant for the ethyl (2,3-dichloro-4-formylphenoxy)acetate and acetylacetone recited in Example 1, Step A, and following substantially the procedure described in Steps A, B and C of that example all of the corresponding [4-(1-organothio-2,2-diacylethyl)phenoxy]alkonic acid products (Ib, infra) of this invention may be obtained. The following equation illustrates the reaction of Example 1, Steps A–C, and, together with Table I, infra, depict the (4-formylphenoxy)-alkanoic acid ester (IIIa) and diacylmethyl precursors of the process, the [(2,2-diacylvinyl)phenoxy]alkanoic acid intermediates (IIb) and the corresponding products (Ib) derived therefrom:

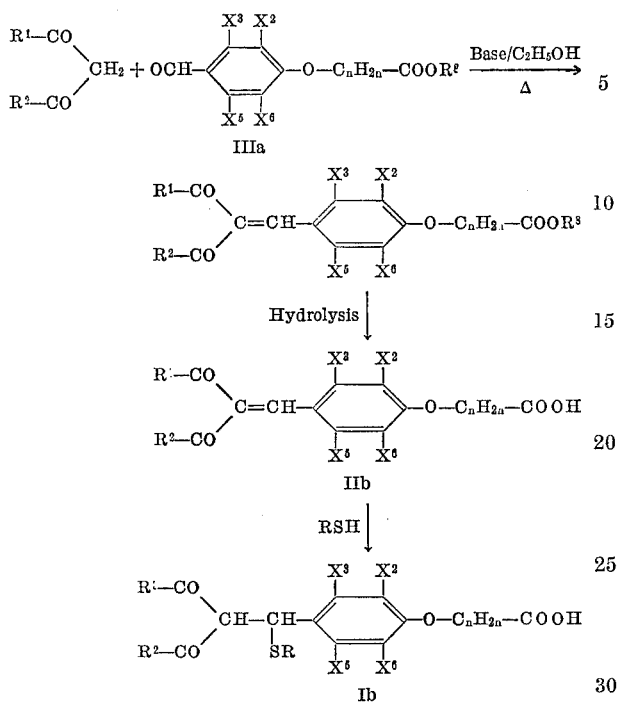

The products of the invention can be administered in a wide variety of therapeutic dosages in conventional vehicles as, for example, by oral administration in the form of a capsule or tablet as well as by intravenous injection. Also, the dosage of the products may be varied over a wide range as, for example, in the form of capsules or scored tablets containing 5, 10, 20, 25, 50, 100, 150, 250 and 500 milligrams, i.e., from 5 to about 500 milligrams, of the active ingredient for the symptomatic adjustment of the dosage to the patient to be treated. These dosages are well below the toxic or lethal dose of the products.

A suitable unit dosage form of the products of this invention can be prepared by mixing 50 mg. of a [(1-organothio-2,2-diacylethyl)phenoxy]alkanoic acid or a suitable acid addition salt, ester or amide derivative thereof, with 144 mg. of lactose and 6 mg. of magnesium stearate and placing the 200 mg. mixture into a No. 3 gelatin capsule. Similarly, by employing more of the active ingredient and less lactose, other dosage forms can be put up in No. 3 gelatin capsules and, should it be necessary to mix more than 200 mg. of ingredients together, larger capsules may be employed. Compressed tablets, pills or other desired unit dosages can be prepared to incorporate the compounds of this invention by conventional methods and, if desired, can be made up as elixirs or as injectable solutions by methods well known to pharmacists.

It is also within the scope of this invention to combine two or more of the compounds of this invention in a unit dosage form or to combine one or more of the compounds with other known diuretics and saluretics or with other desired therapeutic and/or nutritive agents in dosage unit form.

The following example is included to illustrate the preparation of a representative dosage form:

EXAMPLE 22

Dry-filled capsules containing 50 mg. of active ingredient per capsule

| | Per capsule, mg. |
|---|---|
| [2,3-dichloro-4-(1-carboxymethyl-thio - 2 - acetyl-3-oxobutyl)phenoxy]acetic acid | 50 |
| Lactose | 144 |
| Magnesium stearate | 6 |
| Capsule size No. 3 | 200 |

The [2,3 - dichloro-4-(1-carboxymethylthio - 2 - acetyl-3-oxobutyl)phenoxy]acetic acid is reduced to a No. 60 powder and then lactose and magnesium stearate are passed through a No. 60 bolting cloth onto the powder and the combined ingredients admixed for 10 minutes and then filled into No. 3 dry gelatin capsules.

Similar dry-filled capsules can be prepared by replacing the active ingredient of the above example by any of the other novel compounds of this invention.

TABLE I

| Ex. | R | $R^1$ | $R^2$ | $R^3$ | $X^2$ | $X^3$ | $X^5$ | $X^6$ | $-C_nH_{2n}-$ |
|---|---|---|---|---|---|---|---|---|---|
| 10 | $-C(CH_3)_3$ | $-CH_3$ | $-CH_3$ | $-C_2H_5$ | Cl | $-CH_3$ | H | H | $-CH_2-$ |
| 11 | $-\langle\phantom{x}\rangle$ | $-CH_3$ | $-CH_3$ | $-C_2H_5$ | $-CH_3$ | Cl | H | H | $-CH_2-$ |
| 12 | $-C_2H_5$ | $-CH_3$ | $-CH_3$ | $-CH_3$ | H | F | H | H | $-CH_2-$ |
| 13 | $-CH_2-CH=CH_2$ | $-C_2H_5$ | $-C_2H_5$ | $-CH_3$ | H | $-CH_3$ | $-CH_3$ | H | $-(CH_2)_3-$ |
| 14 | $-(CH_2)_2CH_3$ | $-C_2H_5$ | $-CH_3$ | $-CH_3$ | H | Cl | H | H | $-(CH_2)_3-$ |
| 15 | $-CH_2-CH_2-COOH$ | $-CH_3$ | $-CH_3$ | $-C_2H_5$ | H | H | H | H | $-CH_2-$ |
| 16 | $-CH_2-CH(NH_2)(COOH)$ | $-CH_3$ | $-CH_3$ | $-C_2H_5$ | -CH=CH-CH=CH- | | H | H | $-CH_2-$ |
| 17 | $-COCH_3$ | $-\langle\phantom{x}\rangle$ | $-CH_3$ | $-C_2H_5$ | Cl | Cl | H | H | $-CH_2-$ |
| 18 | $-CH_3$ | $-CH_2-\langle\phantom{x}\rangle$ | $-CH_3$ | n-$C_3H_7$ | Cl | Cl | H | H | $-CH_2-$ |
| 19 | $-CH_2-CH_2OH$ | $-C_2H_5$ | $-CH_3$ | $-CH_3$ | H | Cl | H | H | $-(CH_2)_3-$ |
| 20 | $-CH_2-CH_2-CH(NH_2)(COOH)$ | $-CH_3$ | $-CH_3$ | $-C_2H_5$ | Cl | Cl | H | H | $-CH_2-$ |
| 21 | $-CH_2-CH_2NH_2$ | $-C_2H_5$ | $-C_2H_5$ | $-C_2H_5$ | $-CH_3$ | H | H | $-CH_3$ | $-CH_2-$ |

It will be apparent from the foregoing description that the [(1-organothio-2,2-diacylethyl)phenoxy]alkanoic acid products of this invention and their salt, ester and amide derivatives constitute a valuable class of compounds which have not been prepared heretofore. One skilled in the art will also appreciate that the processes disclosed in the above examples are merely illustrative and are capable of a wide variation and modification without departing from the spirit of this invention.

What is claimed is:

1. A compound having the formula:

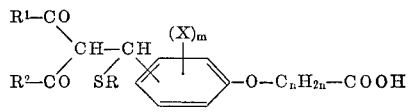

wherein R is alkyl, cycloalkyl containing from 5 to 6 nuclear carbon atoms, lower alkenyl, carboxy lower alkyl, amino lower alkyl, amino substituted carboxy lower alkyl, hydroxy lower alkyl, lower alkanoyl, mononuclear aryl, carboxy substituted aryl or aralkyl; $R^1$ and $R^2$ are similar or dissimilar members selected from alkyl, aryl and aralkyl; the X radicals are similar or dissimilar members selected from hydrogen, halogen, alkyl and, taken together, two X radicals on adjacent carbon atoms of the benzene ring may be joined to form an hydrocarbylene chain selected from tetramethylene and 1,3-butadienylene; $m$ is an integer having a value of 1–4 and $n$ is an integer having a value of 1–3; and the nontoxic, pharmacologically acceptable salts, lower alkyl esters, amide, lower alkylamide and di-lower alkyl amide derivatives thereof.

2. A compound having the formula:

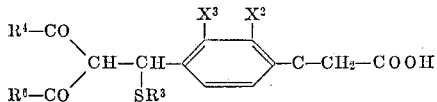

wherein $R^3$ is amino lower alkyl, carboxy lower alkyl, amino substituted carboxy lower alkyl or carboxyphenyl; $R^4$ and $R^5$ are lower alkyl and $X^2$ and $X^3$ are similar or dissimilar members selected from hydrogen, halogen and lower alkyl; and the nontoxic, pharmacologically acceptable acid addition salts, lower alkyl esters, amide, lower alkylaminde and di-lower alkylamide derivatives thereof.

3. The compound of claim 2 wherein $R^3$ is amino lower alkyl and $X^2$ and $X^3$ are halogen.

4. The compound of claim 2 wherein $R^3$ is carboxy lower alkyl and $X^2$ and $X^3$ are halogen.

5. The compound of claim 2 wherein $R^3$ is amino substituted carboxy lower alkyl and $X^2$ and $X^3$ are halogen.

6. The compound of claim 2 wherein $R^3$ is carboxyphenyl and $X^2$ and $X^3$ are halogen.

7. The compound of claim 2 wherein $R^3$ is 2-aminoethyl, $R^4$ and $R^5$ are ethyl and $X^2$ and $X^3$ are chloro.

8. The compound of claim 2 wherein $R^3$ is 2-amino-2-carboxyethyl, $R^4$ and $R^5$ are ethyl and $X^2$ and $X^3$ are chloro.

9. [2,3-dichloro-4-(1-carboxymethylthio - 2 - acetyl-3-oxobutyl)phenoxy]acetic acid.

10. [2,3 - dichloro - 4 - [1-(2 - carboxyphenylthio)-2-acetyl-3-oxobutyl]phenoxy] acetic acid.

References Cited

UNITED STATES PATENTS 3,383,411  5/1968  Schultz _____ 260—516

OTHER REFERENCES

Migrdichian, Organic Synthesis, vol. 2, p. 876.

LORRAINE A. WEINBERGER, Primary Examiner

E. J. GLEIMAN, Assistant Examiner

U.S. Cl. X.R.

260—455, 470, 501.16, 501.1, 559; 424—308, 317, 324

UNITED STATES PATENT OFFICE
CERTIFICATE OF CORRECTION

Patent No. 3,513,190     Dated May 19, 1970

Inventor(s) Edward J. Cragoe, Jr. & John B. Bicking

It is certified that error appears in the above-identified patent and that said Letters Patent are hereby corrected as shown below:

In column 5, line 26, that portion of the formula reading "-COOR$^1$" should read -- -COOR$^7$ --;

In column 6, line 60, "$C_{21}H_{18}Cl_2O_7S$" should be --$C_{16}H_{16}Cl_2O_7S$--;

In column 11, line 13, that portion of the formula reading "R$^6$-CO$^\diagup$" should be R$^5$-CO$^\diagup$;

In column 11, line 20, "alkylaminde" should be --alkylamide--.

SIGNED AND SEALED
SEP 29 1970

(SEAL)
Attest:

Edward M. Fletcher, Jr.
Attesting Officer

WILLIAM E. SCHUYLER, JR.
Commissioner of Patents